United States Patent Office 3,413,342
Patented Nov. 26, 1968

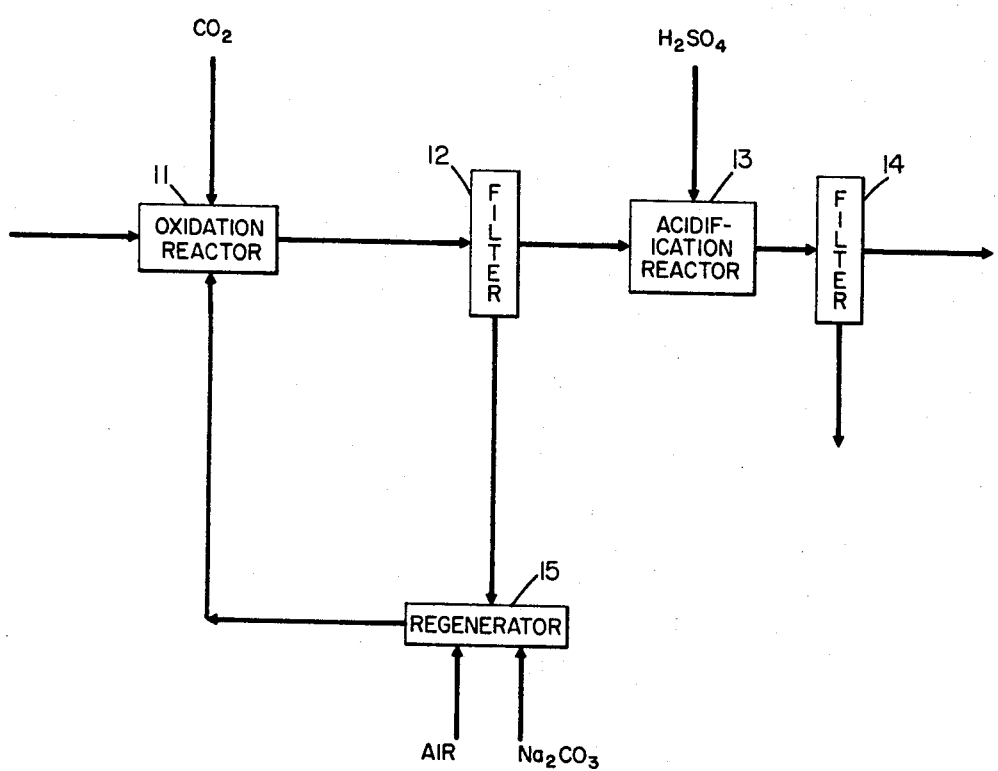

3,413,342
REMOVAL OF DISCOLORANTS FROM CHROMATE OXIDATION PRODUCTS
Joe T. Kelly, Littleton, Colo., assignor to Marathon Oil Company, Findlay, Ohio, a corporation of Ohio
Filed Feb. 16, 1965, Ser. No. 433,081
9 Claims. (Cl. 260—524)

ABSTRACT OF THE DISCLOSURE

The present invention comprises: A process for the preparation of chomate oxidation products by the oxidation of alkyl aromatic hydrocarbons in the presence of $CO_2$ and soluble inorganic dichromate salts, the steps comprising in combination adjusting the pH of the product mixture obtained from the oxidation to from about 8 to about 12 and adjusting the temperature to from about 150 to about 350° F., thereafter adding to the product mixture from the oxidation reactor about 1 to 3 moles per mole of chromium (VI) in the product mixture of a soluble sulfur-oxygen compound in which sulfur has a valence of IV, and removing the precipitate.

---

The present invention relates to processes for the production of chromate oxidation products free from discoloring heavy metals, and in particular, the present invention relates to methods for the treatment of product mixtures containing the metal salts of carboxylic acids to remove heavy metals prior to the conversion of the salts to the corresponding acids.

The oxidation products of alkylaromatic hydrocarbons, and particularly those obtained by the chromate oxidation in the presence of $CO_2$ are useful for the production of polyesters, alkyd resins, and various other polymeric materials. The color of such polymeric materials is important to their commercial value and the products of conventional chromate oxidations have often tended to discolor more or less gradually.

The present invention embodies the discovery that this discoloration is primarily caused by the presence of heavy metals and provides a method for the removal of these heavy metals after oxidation is complete. The metal removal is effected by the present invention without the necessity of expensive processing equipment or a large number of purification steps, and the sodium sulfate by-product normally produced in such chromate reactions is not contaminated by the processes of the present invention, and is, therefore, not decreased in commercial value. In addition, the unreacted chromium or other heavy metal compounds obtained from the reactor effluent by the process of the present invention are easily recycled to a regeneration system thereby eliminating the losses of these expensive oxidants commonly encountered in conventional processes.

FIGURE 1 is a schematic diagram of a preferred embodiment of the present invention.

In FIGURE 1 2,6-dimethylnaphthalene is fed to oxidation reactor 11 together with about 220 pounds of $CO_2$ (sufficient to pressurize the reactor to a total pressure of about 1,500 p.s.i.g. and about 1,022 pounds of a $$Na_2Cr_2O_7/Na_2CrO_4$$

mixture containing about 65% $Na_2Cr_2O_7$ and being dissolved in about 2,000 pounds of water. The mixture is agitated and the reaction is permitted to continue for about 2 hours, after which the unreacted dimethylnaphthalene is separated from the product mixture by decantation. The temperature is then adjusted to from 150 to 350° F., preferably from 175 to 250° F. The product mixture, still remaining in the oxidation reactor, is then treated with about 45 pounds of sodium bisulfite (approximately twice the stoichiometric quantity). Immediately, a large quantity of chromic oxide precipitates, and the orange color of the product mixture changes abruptly to a deep green. This color change is indicative of a conversion of unreacted soluble chromium (VI) to dispersed solid chromium (III). The conversion is nearly quantitative, and virtually all chromium (VI) is removed from the solution. The pH of the product mixture is adjusted as necessary to be at least about 8 and preferably from 8 to 12 at this point and the product mixture is filtered using a conventional type of plate and frame filter 12 with No. 50 or similar filter paper between the plates. The filtrate thus produced is essentially colorless. In reactor 13, this solution is acidified with sulfuric acid to a pH of about 2 and 2,6-dicarboxynaphthalene precipitates. The 2,6-dicarboxynaphthalene thus produced is separated out in filter 14 and is found to be virtually pure white in color indicating that it is free from substantial quantities of either chromium (VI) or chromium (III). Analysis confirms the substantial absence of chromium and also indicates that no substantial quantities of iron are contained in the product. Because the process of the present invention removes the iron together with the chromium, the glass-lined reaction vessels commonly used for such preparations are not necessary, and less expensive steel vessels may be employed in most instances.

It will be noted that the above example employs only an oxidation reactor, filter press, and storage tank, all of which would be normally employed in the conventional preparation of the 2,6-dicarboxynaphthalene. Thus in preferred embodiments, the present invention requires the use of no additional equipment and instead permits the use of reactors less expensive than those conventionally employed. Since the second acidification with sulfuric acid is required in conventional preparations, the additional steps required for the practice of the present invention are merely the addtion of the sodium bisulfite, and the first pH adjustment, which may be omitted in some cases discussed hereinafter.

In particularly preferred embodiments, the solid material removed by the first filtration, which is composed mainly of $Na_2CO_3$, $NaHCO_3$ and $Cr_2O_3$, is sent to a regenerator (shown as element 15 in FIGURE 1) where it is mixed preferably with approximately twice stoichiometric quantities of oxygen, preferably air and an alkali metal base, preferably NaOH, $NaHCO_3$ or $Na_2CO_3$ to regenerate $Na_2CrO_4$ for return to the oxidation reactor. Most preferred will be the use of the same alkali metal cation throughout the process.

The solids removed by the second filtration are 2,6-dicarboxynaphthalene while the filtrate is primarily a solution of $Na_2SO_4$, the by-product normally obtained in conventional sodium chromate oxidation reactions, when using the sulfuric acid for precipitating the organic acid.

While the above preferred embodiment has been described as involving sodium bisulfite, and while that compound is preferred for most applications, it should be understood that an equivalent number of moles of alkali metal sulfites, alkali metal metasulfites and other alkali metal bisulfites may be substituted. Also, it should be understood that, while it is preferred, sodium is intended to be merely exemplary of the cations which may be employed and that any of the corresponding alkali metal salts having suitable solubility and reactivity and even the corresponding salts of other suitable cations, e.g., ammonia, may be employed in the process. When it is not necessary to recover high purity $Na_2SO_4$, any mineral acid such as HCl or $H_3PO_4$ can be used to precipitate the acid.

In place of the above described final acidification with $H_2SO_4$, the processes of copending application of the same assignee, Ser. No. 420,502, filed Dec. 23, 1964, by J. W. Patton and M. O. Son, Jr., may be used. Also, the purification process described in copending application of the same assignee, Ser. No. 420,503, filed Dec. 23, 1964, by J. W. Patton and M. O. Son, Jr., may be employed with the present invention.

The $Cr_2O_3$ which precipitates in the course of oxidizing the aromatic hydrocarbon in reactor 11 may optionally be removed by conventional means prior to the addition of $NaHSO_3$. The optimum pH will vary somewhat according to the raw materials being oxidized. pH adjustment is usually not necessary when using $NaHSO_3$ or $Na_2SO_3$. Where necessary, the pH adjustment can be accomplished by the addition of any common alkali having suitable solubility and not causing undesirable side reactions, but in most cases, the hydroxides or carbonates of sodium or potassium will be preferred. In order to prevent the addition of extraneous cations, it is especially desirable that the alkali used in pH adjustment have the same cation as the chromate used in the oxidation step and as the bisulfite or other sulfur-oxygen compound to be utilized later in the process.

The acidification which follows the first filtration is utilized primarily to convert the products of the oxidation, generally metal salts of carboxylic acids to the corresponding carboxylic acids. This conversion may also be accomplished by ion exchange or other methods. Where acid is utilized, in general, the pH will preferably be below about 2 and most preferably from about 1 to 1.9 but, as in the first pH adjustment, optimum pH range will vary somewhat with the raw materials being oxidized.

In place of the filtrations described above, centrifugations or other conventional separatory processes may be empolyed, and "filtering" as used herein includes all such methods. The entire process may, of course, be conducted on either a batch or continuous basis.

The invention may be employed advantageously with a wide variety of alkylaromatics including among others monoalkyl benzenes such as toluene, ethylbenzene, propylbenzene, and butylbenzene; dialkylbenzenes such as dimethylbenzenes, diethylbenzenes dipropylbenzenes and dibutylbenzenes; and other polyalkylbenzenes such as trimethylbenzenes, triethylbenzenes, and tripropylbenzenes; monoalkylnaphthalenes such as methyl-, ethyl-, and propylnaphthalenes; dialkylnaphthalenes such as dimethyl-, diethyl-, and dipropylnaphthalenes; polyalkylnaphthalenes such as trimethylnaphthalenes, tetramethylnaphthalenes, and dimethyldiethylnaphthalenes; and the corresponding tetralin derivatives, alkylphenanthrenes, alkylanthracenes, etc. Especially preferred are the mono and dialkylbenzenes and naphthalenes wherein the alkyl groups contain from 1 to about 6 carbon atoms, and of these, those having methyl groups are most preferred.

EXAMPLE I

Preparation of 2,6-dicarboxynaphthalene free from discoloring heavy metal impurities Utilizing an equipment system similar to that described in FIGURE 1, there is fed to a 500 gallon pressure type agitated oxidation mild steel reactor 257 pounds of 2,6-dimethylnaphthalene (a 10% excess over stoiichiometric quantity), roughly 220 pounds of $CO_2$ (an amount necessary to maintain the below mentioned reactor pressure), and an aqueous $Na_2Cr_2O_7/Na_2CrO_4$ solution consisting of 671 pounds of sodium dichromate ($Na_2Cr_2O_7 \cdot 2H_2O$), 351 pounds of sodium chromate ($Na_2CrO_4 \cdot 4H_2O$), and 2,050 pounds of water. The oxidation reactor operates at about 1,500 p.s.i.g. maintained by the $CO_2$ feed and at about 260° C. This pressure and temperature are maintained in the reactor for a reaction time of about 4 hours. After recovery of the unreacted alkylaromatics (amounting to about 10% of the total 2,6-dimethylnaphthalene added) for later recycle to the reactor, the remainder of the reaction mixture containing solid $Cr_2O_3$, $NaHCO_3$ and $Na_2CO_3$ and a solution of the above carbonates and the sodium salt of 2,6-dicarboxynaphthalene is treated with about 45 pounds of sodium bisulfite by adding it slowly with stirring at about 175 to 250° F. Chromic oxide precipitates, changing the orange product solution to a deep green. The product mixture is then filtered through a plate and frame filter using No. 50 or similar filter paper and the chromic oxide thus produced and that formed in the oxidation along with $NaHCO_3$ and $Na_2CO_3$ (about 540 pounds total $Cr_2O_3 \cdot 1.5H_2O$) is retained for regeneration and reuse. The pH of the filtrate is approximately 9. The filtrate is then acidified with about 190 pounds of sulfuric acid which causes white 2,6-dicarboxynaphthalene to precipitate. The precipitate is removed by filtering as before, and the filtrate is evaporated to recover about 270 pounds of $Na_2SO_4$ which is found to be free of iron or heavy metals. About 305 pounds of dicarboxynaphthalene is recovered and is found to be of excellent whiteness with virtually no heavy metal content.

The $Cr_2O_3$ recovered by the first filtration is heated with about 2,500 pounds of $NaHCO_3$ while under oxygen pressure to regenerate it to a mixture of $Na_2CrO_4/Na_2Cr_2O_7$ for use in subsequent oxidations.

In summary, the invention comprises in a process for the preparation of chromate oxidation products by the oxidation of alkyl aromatic hydrocarbons in the presence of $CO_2$ and soluble inorganic dichromate salts, the steps comprising in combination adjusting the pH of the product mixture obtained from the oxidation to from about 8 to about 12 and adjusting the temperature to from about 150 to about 350° F., thereafter adding to the product mixture from the oxidation reactor about 1 to 3 moles per mole of chromium (VI) in the product mixture of a soluble sulfur-oxygen compound in which sulfur has a valence of IV, and removing the precipitate.

The invention also comprises preferred embodiments wherein the soluble sulfur-oxygen compound is selected from the group consisting of alkali metal bisulfites, alkali metal sulfites, alkali metal metabisulfites, and sulfur dioxide.

The foregoing example and discussions are merely illustrative and the invention is to be understood to include all of the variations and modifications which are apparent to those skilled in the art.

What is claimed is:

1. In a process for the preparation of chromate oxidation products by the oxidation of alkyl aromatic hydrocarbons in the presence of $CO_2$ and soluble inorganic dichromate salts, the steps comprising in combination adjusting the pH of the product mixture obtained from the oxidation to from about 8 to about 12 and adjusting the temperature to from about 150 to about 350° F., thereafter adding to the product mixture from the oxidation reactor about 1 to 3 moles per mole of chromium (VI) in the product mixture of a water soluble sulfur-oxygen compound selected from the group consisting of alkali metal sulfites, alkali metal bisulfites and alkali metal metasulfites in which sulfur has a valence of IV, and removing the precipitate.

2. The process of claim 1 wherein the precipitate removed is treated with an oxygen-containing gas and an alkali metal base in order to produce a soluble alkali metal dichromate for recycle to the oxidation process.

3. The process of claim 1 wherein the alkali metal is in all cases sodium.

4. A process for the preparation of aromatic carboxylic acids substantially free from heavy metal contaminants comprising in combination the steps of oxidizing alkyl aromatic hydrocarbons in the presence of $CO_2$ and soluble inorganic dichromate salts, thereafter adjusting the pH to from about 8 to about 12, and adjusting the temperature to from about 150 to about 350° F., thereafter adding to the product mixture from the oxidation reaction about 1 to 3 moles per mole of chromium (VI) in the product mixture of a water soluble sulfur-oxygen compound in which sulfur has a valence of IV selected from the group consisting of alkali metal sulfites, alkali metal bisulfites and alkali metal metasulfites, filtering and adjusting the pH of the filtrate to below about 2 and thereafter refiltering the filtrate at a temperature of from about 30 to about 250° F. to recover the acid precipitate produced.

5. The process of claim 4 wherein the alkyl hydrocarbons are selected from the group consisting of monoalkylbenzenes, dialkylbenzenes, monoalkylnaphthalenes, dialkylnaphthalenes, and wherein the alkyl hydrocarbon groups contain from 1 to about 6 carbon atoms.

6. The process of claim 4 wherein the alkyl hydrocarbons comprise compounds selected from the group consisting of toluene, xylenes, monomethylnaphthalenes, and dimethylnaphthalenes.

7. A process for the preparation of alkali metal salts of aromatic acids which salts are substantially free from heavy metal contaminants comprising in combination the steps of oxidizing alkyl aromatic hydrocarbons in the presence of $CO_2$ and water soluble inorganic dichromate salts, thereafter adjusting the pH of the product mixture to from about 8 to 12 and the temperature to from 150 to about 350° F., thereafter adding to the product mixture from the oxidation reaction about 1 to 3 moles per mole of chromium (VI) in the product mixture of a water soluble sulfur-oxygen compound in which sulfur has a valence of IV selected from the group consisting of alkali metal sulfites, alkali metal bisulfites and alkali metal metasulfites, thereafter filtering and recovering said alkali metal salts of aromatic acids from the resulting filtrate.

8. The process of claim 7 wherein the alkyl hydrocarbons are selected from the group consisting of monoalkylbenzenes, dialkylbenzenes, monoalkylnaphthalenes, dialkylnaphthalenes, and wherein the alkyl hydrocarbon groups contain from 1 to about 6 carbon atoms.

9. The process of claim 8 wherein the alkyl hydrocarbons comprise compounds selected from the group consisting of toluene, xylenes, monomethylnaphthalenes, and dimethylnaphthalenes.

References Cited
UNITED STATES PATENTS

| 1,998,925 | 4/1935 | Demant | 260—524 |
| 2,899,466 | 8/1959 | O'Neil | 260—525 |

HENRY R. JILES, *Primary Examiner.*